United States Patent [19]
Tortora

[11] Patent Number: 5,610,341
[45] Date of Patent: Mar. 11, 1997

[54] MODULAR OIL MONITOR

[75] Inventor: Carmine G. Tortora, N. Andover, Mass.

[73] Assignee: General Electric Company, Cincinnati, Ohio

[21] Appl. No.: 629,153

[22] Filed: Apr. 8, 1996

[51] Int. Cl.$^6$ ..................................................... G01L 7/00
[52] U.S. Cl. ........................................................... 73/756
[58] Field of Search ............................ 73/700, 708, 714, 73/756; 290/52; 60/330, 347; 184/88.1; 340/450.3, 626

[56] References Cited

PUBLICATIONS

Traeger, "Aircraft Gas Turbine Engine Technology," 1979, pp. Cover, i, ii, 286–293 & 511–517.
GE Aircraft Engines, "CF34 Turbofan Engine CF34–3A1," SEI–755, Sep. 1993, Figures 1 & 10.
GE Aircraft Engines, "CF34 Training Guide," SEI–612, Mar. 1989, Figures 3–1 and 3–2.
Rolls–Royce, RB211 Accessories Gearbox, more than 1 year in use or publication, seven figures, Sep. 1994.

*Primary Examiner*—Richard Chilcot
*Assistant Examiner*—William L. Oen
*Attorney, Agent, or Firm*—Andrew C. Hess; Wayne O. Traynham

[57] ABSTRACT

A modular oil monitor for a gas turbine engine includes a mounting pad having a seat with a plurality of oil inner ports disposed therein and joined in flow communication with an oil tank and an oil sump of the engine. A module having a base is removably fixedly joined to the seat, with the base having a plurality of oil outer ports disposed therein and joined in flow communication with respective ones of the inner ports. The module also includes a filter circuit disposed in flow communication between first and second ones of the outer ports, with the filter circuit including an oil filter removably joined to the module for filtering supply oil channeled therethrough. A first sensor is removably joined to the module for measuring the oil temperature or pressure. The module provides at one location various lubricating system components which may be individually inspected or replaced. Or, the entire module may be replaced in one operation.

10 Claims, 3 Drawing Sheets

1

MODULAR OIL MONITOR

BACKGROUND OF THE INVENTION

The present invention relates generally to gas turbine engines, and, more specifically, to lubricating systems therein.

A gas turbine engine includes one or more rotors which support fan, compressor, and turbine blades for rotation in the engine during operation. The rotors are therefore mounted in bearings which must be suitably lubricated during operation. A typical lubricating system includes an oil tank holding lubricating supply oil which is pumped through an oil filter and oil cooler and suitably channeled to the various bearings for the lubrication thereof. Oil discharged from the bearings is collected in suitable sumps and is referred to as scavenge oil which has been heated by passage through the bearings and may contain debris or metallic chips over the course of time. The scavenge oil is suitably pumped back to the oil tank from which it repeats the lubricating circuit.

Since the lubricating oil is an important working fluid in a gas turbine engine, filtering and cooling thereof is monitored during operation. Monitoring of the oil may be conducted at various locations in the lubricating system which has various components spread axially and vertically across the extent of the engine. The lubricating system typically includes oil temperature and pressure sensors, as well as magnetic chip detectors.

Over the course of operation, the filter removes particles from the circulating oil, and therefore is periodically replaced. In the event the filter becomes prematurely filled with particles, a bypass valve is provided to divert the supply oil around the filter to ensure a continuous supply of oil to the bearings. An impending bypass sensor is typically provided around the filter to provide a visual indication of impending bypass valve operation. The bypass sensor may provide an electrical signal to a suitable gage, or may have a pop-up pin which may be visually observed when a preselected pressure drop exists across the filter.

The lubricating system also typically includes a relief valve to divert a portion of the supply oil directly back to the oil tank in the event of excessive supply oil pressure to the bearings. A suitable supply oil pump is disposed between the oil tank and the filter for circulating the supply oil through the bearings. And, separate scavenge oil pumps are typically also provided for returning the scavenge oil from the oil sumps back to the oil tank.

Most malfunctions which occur in the lubricating system are found in the various valves and sensors. Accordingly, during a service operation to uncover the source of a monitored malfunction, the various portions of the lubricating system must be accessed for visual observation of the components thereof, as well as for removal and replacement of the components if required. In a commercial, passenger carrying aircraft powered by gas turbine engines, prompt servicing of the lubrication system is of significant importance for minimizing the down time of the aircraft from revenue service.

In aircraft tail-mounted engines, the engines are positioned relatively high in the aircraft and must be accessed by providing suitable ladders or staircases. In a typical lubricating system, some portions thereof are accessible only from the top of the engine, whereas other portions thereof are accessible only from the bottom of the engine. This increases the difficulty and time in servicing the lubricating system. And, since the various components of the system are spread about in the engine, each component must be separately accessed, examined, and replaced if required which also increases the duration of the servicing operation.

Yet further, the various components of the lubricating system are crowded together with other components of the engine and makes access thereto and replacement thereof even more difficult and time consuming in view of the limited access thereto.

SUMMARY OF THE INVENTION

A modular oil monitor for a gas turbine engine includes a mounting pad having a seat with a plurality of oil inner ports disposed therein and joined in flow communication with an oil tank and an oil sump of the engine. A module having a base is removably fixedly joined to the seat, with the base having a plurality of oil outer ports disposed therein and joined in flow communication with respective ones of the inner ports, The module also includes a filter circuit disposed in flow communication between first and second ones of the outer ports, with the filter circuit including an oil filter removably joined to the module for filtering supply oil channeled therethrough. A first sensor is removably joined to the module for measuring the oil temperature or pressure. The module provides at one location various lubricating system components which may be individually inspected or replaced. Or, the entire module may be replaced in one operation.

BRIEF DESCRIPTION OF THE DRAWINGS

The invention, in accordance with preferred and exemplary embodiments, together with further objects and advantages thereof, is more particularly described in the following detailed description taken in conjunction with the accompanying drawings in which.

DESCRIPTION OF THE PREFERRED EMBODIMENTS

Figure 1:
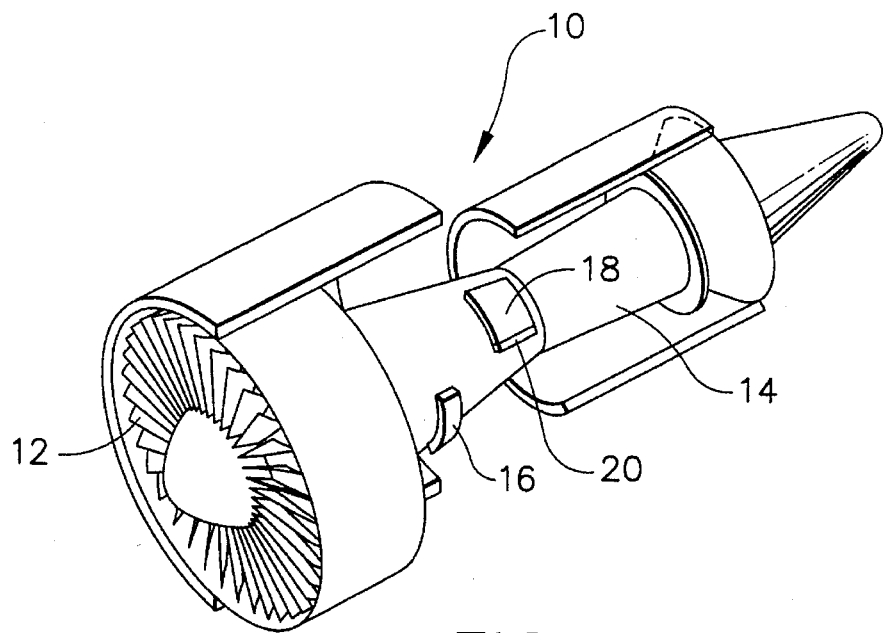
FIG. 1 is an isometric view of an exemplary aircraft turbofan gas turbine engine including a modular oil monitor in accordance with one embodiment of the present invention.

Illustrated schematically in FIG. 1 is an exemplary aircraft turbofan gas turbine engine 10 which is configured for mounting to the tail of an aircraft (not shown) in an exemplary mounting configuration. The engine 10 includes a conventional fan 12 driven by a conventional core engine 14 which includes a compressor, combustor, and turbine. The engine 10 also includes a conventional accessory gearbox 16 which provides output power for operating the various accessories of the engine including the lubricating system thereof. The lubricating system includes a suitable oil tank 18 mounted adjacent to the gearbox 16 which holds a suitable lubricating or supply oil.

In accordance with one embodiment of the present invention, a modular oil monitor 20 is suitably mounted in the engine 10 to collect at a single, conveniently accessible location various components for monitoring the lubricating system for improving servicing or maintenance thereof. In the exemplary embodiment illustrated in FIGS. 1 and 2, the oil monitor 20 is conveniently joined to the bottom of the oil tank 18 for providing access thereto by opening access panels in the nacelle or cowl of the engine 10 in a conventional manner. The modular oil monitor 20 is also illustrated schematically in FIG. 3 in conjunction with other components of the lubricating system within the engine 10.

Figure 3:
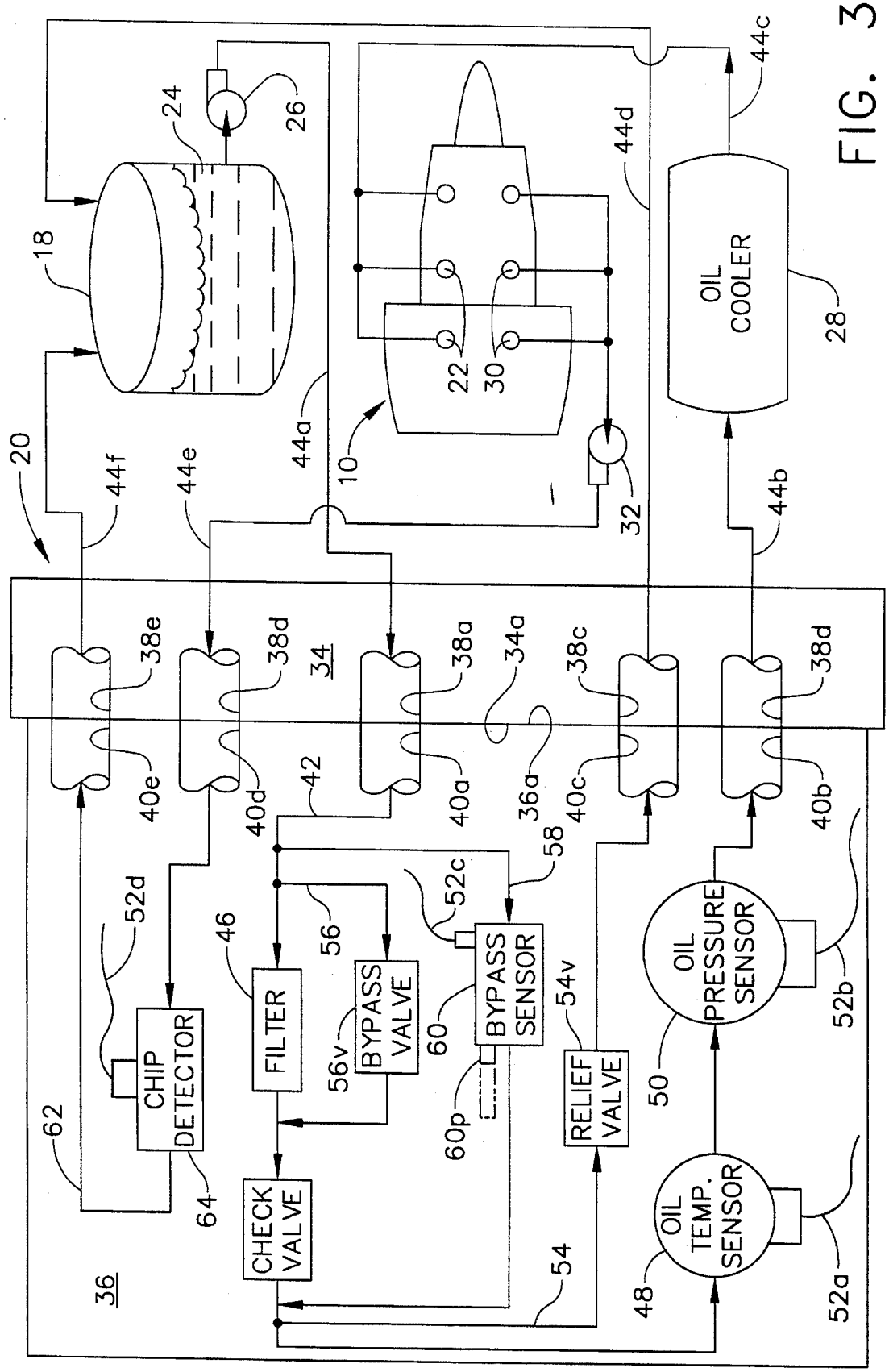
FIG. 3 is a schematic representation of the modular oil monitor illustrated in FIG. 2 joined in operation with an oil tank and oil cooler within the engine illustrated in FIG. 1.

More specifically, and referring initially to FIG. 3, the engine 10 includes a plurality of conventional bearings 22 which require lubrication by the lubricating oil 24 which is initially held in the oil tank 18 at the commencement of the lubricating circuit. The oil 24 is pumped by a suitable supply pump 26 for flow through the oil monitor 20 and in turn through a conventional heat exchanger or oil cooler 28 which is conventionally joined in flow communication to the several bearings 22. Upon leaving the bearings 22, the spent oil is collected in corresponding oil sumps 30 and then pumped by one or more scavenge pumps 32 through corresponding conduits for returning the scavenge oil back to the oil tank 18.

Figure 2:
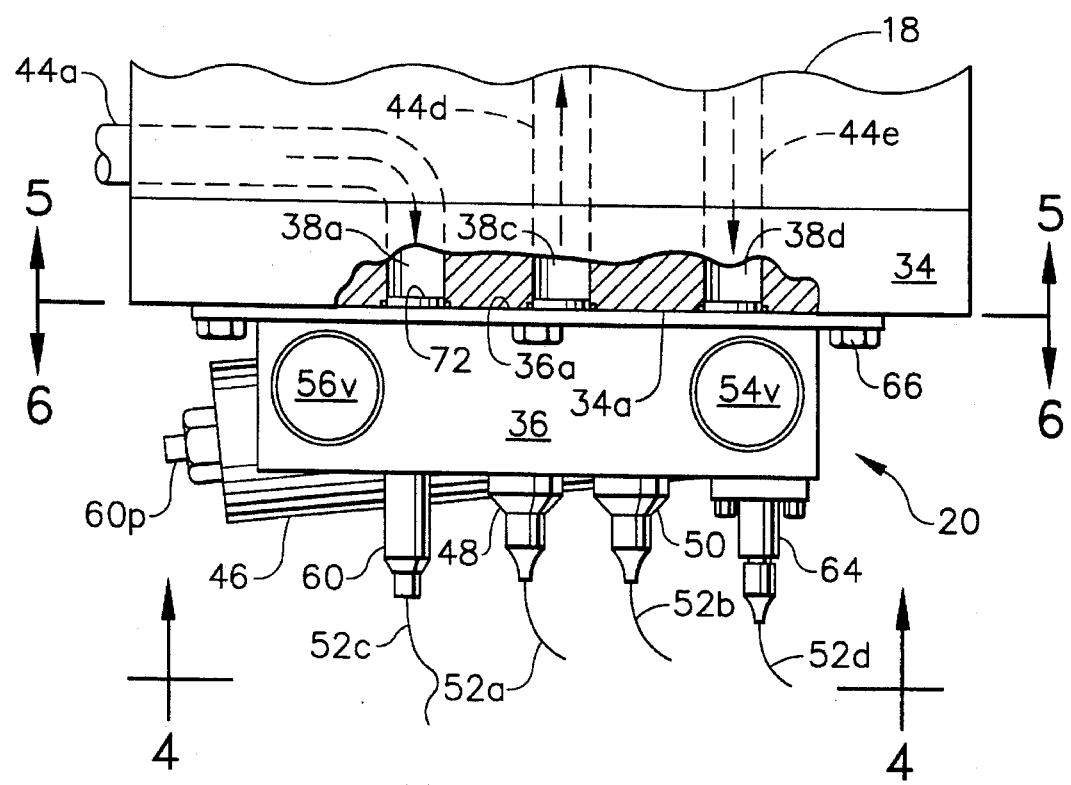
FIG. 2 is a side elevation view of the modular oil monitor illustrated in FIG. 1 including a service module joined to a mounting pad.

The modular oil monitor 20 is illustrated in an exemplary embodiment in FIGS. 2 and 3 and includes a one-piece mounting block or pad 34 which supports a removable one-piece service module 36 which is configured in accordance with the present invention for bringing together at one convenient location the various components of the lubricating system which require periodic visual inspection, testing, and replacement as required. In the exemplary embodiment illustrated in FIGS. 2 and 3, the mounting pad 34 is suitably fixedly joined to the bottom of the oil tank 18, although in alternate embodiments it may be located wherever convenient for providing access to the service module 36.

Figure 5:
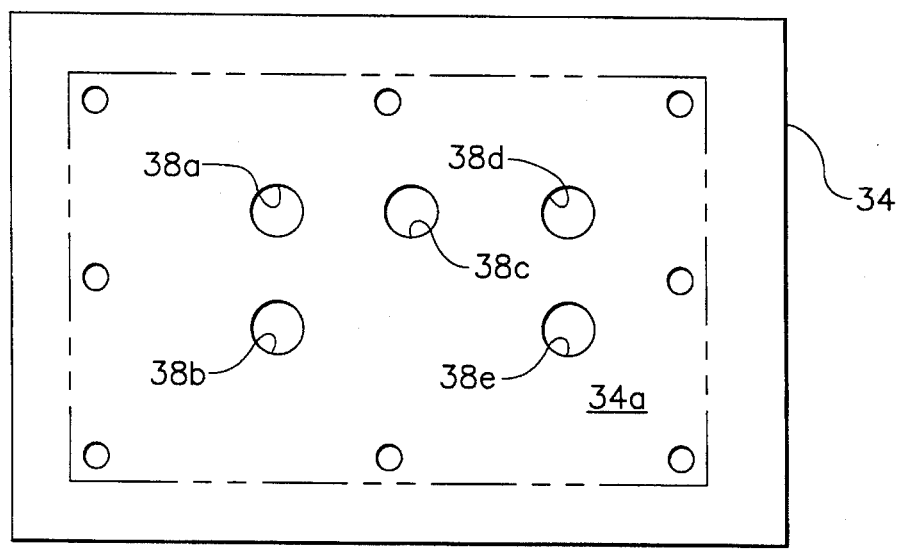
FIG. 5 is a plan view of the mounting pad illustrated in FIG. 2 and taken along line 5—5.
Figure 6:
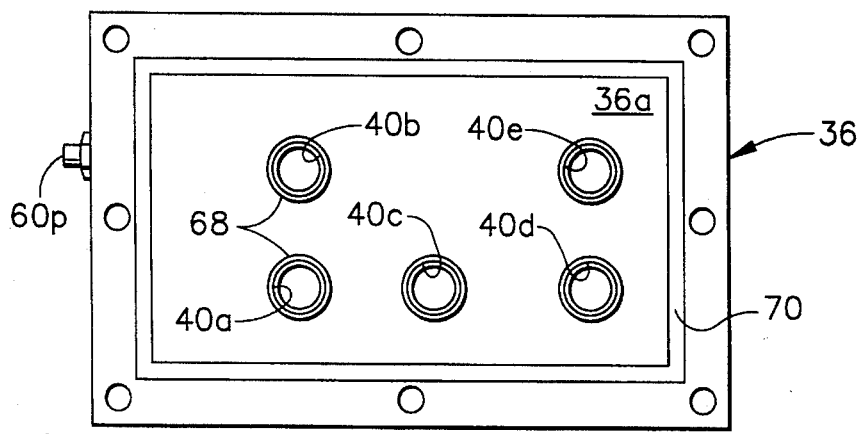
FIG. 6 is a top view of the service module illustrated in FIG. 2 and taken along line 2—2.

As shown in FIGS. 2, 3, and 5, the mounting pad 34 is preferably a unitary solid member having suitable internal passages which may be formed therein by casting for example. The mounting pad 34 is configured for providing fluid connections to the various conduits and circuits of the lubricating system at a common, accessible location for allowing convenient monitoring of operating components thereof. The mounting pad 34 preferably includes a single-plane, flat mounting seat 34a against which is disposed in sealed and abutting contact a complementary single-plane, flat base 36a of the service module 36 as illustrated in FIGS. 2, 3, and 6.

As shown in FIGS. 3 and 5, the seat 34a includes a plurality of outwardly facing oil inner holes or ports collectively designated by the prefix 38, which are laterally spaced apart from each other across the seat 34a. As shown in FIGS. 3 and 6, the module base 36a correspondingly includes a plurality of laterally spaced apart oil outer ports collectively designated by the prefix 40 which are joined in flow communication with respective ones of the inner ports 38. The various inner ports 38 are joined in flow communication with the oil tank 18 and the sumps 30 as desired for specific embodiments of the invention for channeling the supply and scavenge oil for desired monitoring thereof.

In the exemplary embodiment illustrated in FIG. 3, the service module 36 further includes a first or filter circuit 42 which may be integrally cast therein, and which is disposed in flow communication between first and second ones of the outer ports designated 40a and 40b, respectively. Correspondingly, the mounting pad 34 includes first and second inner ports 38a and 38b, respectively, which correspondingly abut the first and second outer ports 40a,b to provide flow junctions thereat. The first inner port 38a is suitably joined by a first conduit or pipe 44a to the outlet of the supply pump 26 for carrying the pressurized supply oil to the mounting pad 34 and in turn to the service module 36. The second inner port 38b is suitably joined by a second conduit 44b to the inlet of the oil cooler 28 which in turn is suitably joined by a third conduit 44c in flow communication with the several bearings 22.

As shown in FIG. 3, supply oil from the supply pump 26 enters the service module 36 through the first outer port 40a and is channeled through the filter circuit 42 therein. The filter circuit 42 includes in series flow therein a conventional oil filter 46 which may take any suitable form for being removably joined to the module 36. In the exemplary embodiment illustrated in FIG. 4, the oil filter 46 is in the form of a screw-on cartridge removably mounted to a corresponding mounting flange extending outwardly from the module 36. The supply oil is filtered in the filter 46 and is returned through the filter circuit 42 to the second outer port 40b which forms a fluid juncture with the second inner port 38b. From here, the filtered supply oil is channeled through the oil cooler 28 for cooling, and in turn to the bearings 22.

In the exemplary embodiment illustrated in FIG. 3, the filter circuit 42 includes at least one and preferably two sensors 48 and 50 which are removably joined to the module 36 for measuring oil temperature and pressure, respectively, in a conventional manner. The first sensor 48 may be configured for measuring temperature and is disposed in serial flow communication in the filter circuit 42 between the filter 42 and the second outer port 40b. The second sensor 50 is configured for measuring oil pressure and is disposed in series flow between the first sensor 48 and the second outer port 40b. In this way, the temperature and pressure sensors 48, 50 are conveniently located in the vicinity of the filter 46 in the service module 36, with each of these three components being independently visually accessible, as well as being individually removable when required.

The sensors 48, 50 preferably have respective electrical leads 52a and 52b to carry their signals to suitable monitors. The leads are conventionally removably joined to the individual sensors 48, 50 in a suitable snap-together arrangement. By disconnecting the respective leads 52a,b from the sensors 48, 50, each sensor itself may be separately removed and replaced if desired. Or, the entire service module 36 including the sensors 48 and 50 therein may be removed from the mounting pad 34 and replaced with a corresponding service module 36 to provide expedited replacement thereof. Testing of the removed module 36 may then be accomplished when convenient, with bench testing thereof as desired.

Referring again to FIG. 3, the service module 36 preferably also includes a second or relief circuit 54 disposed in flow communication between the filter circuit 42, downstream of the filter 46, and a third one of the outer ports 40c. The third outer port 40c is disposed in abutting contact with a corresponding third inner port 38c in the mounting pad 34, which in turn is joined in flow communication by a fourth conduit 44d with the oil tank 18. A preferably removable relief valve 54v is disposed in series flow in the relief circuit 54 for diverting a portion of the filtered oil from the filter 46 from discharging through the second outer port 40b and instead through the third outer port 40c.

The module 36 preferably also includes a first bypass circuit 56 disposed in flow communication with the filter circuit 42 as illustrated in FIG. 3 to suitably bypass flow around the filter 46 when required. The bypass circuit 56 includes a preferably removable bypass valve 56v for bypassing the supply oil around the filter 46 upon exceeding a preselected pressure drop or resistance through the filter 46 caused by particle buildup therein.

A second bypass circuit 58 is preferably disposed in flow communication with the filter circuit 42 around the filter 46, and includes a preferably removable bypass sensor 60 for sensing impending bypass of oil through the first bypass circuit 56. The impending bypass circuit 58 and bypass sensor 60 may be conventional, with the bypass sensor 60 having a suitable electrical lead 52c joined to a suitable monitor, with the lead being removably connected to the sensor 60 in a snap-together type arrangement. The impending bypass sensor 60 may also include a conventional pop-out button 60p shown schematically in FIG. 3, and shown in FIG. 2 extending from the free end of the oil filter 46. Excess pressure drop in the filter 46 during operation will cause the bypass sensor 60 to extend the button 60p for visual notification to the servicing technician.

The filter circuit 42, bypass circuit 56, impending bypass circuit 58, and relief circuit 54 are conventionally known and are conventionally configured in the service module 36 itself in accordance with the present invention. In this way, these various circuits are disposed at a common accessible location in the service module 36 itself along with the temperature and pressure sensors 48, 50. The individual sensors 48, 50, and 60 are separately removable from the service module 36 by being simply screw mounted therein. The filter 46 is itself separately removable by being screw mounted to the module 36. And, the separate relief and bypass valves 54v and 56v may be removably mounted in corresponding bores in the service module 36 as illustrated in FIG. 2. Accordingly, each one of these components may be separately visually examined, and removed, and replaced if desired; all at one common location. Or, the entire service module 36 itself including these various components may be simply removed from the mounting pad 34 and replaced with a pre-tested service module 36.

As shown in FIG. 3, the service module 36 may also include a magnetic chip detector circuit 62 disposed in flow communication between fourth and fifth ones of the outer ports 40d and 40e, respectively, which, in turn, are disposed in abutting contact with corresponding fourth and fifth inner ports 38d and 38e. The fourth inner port 38d is suitably joined by a conduit 44e in flow communication with the scavenge pump 32 for receiving the scavenge oil therefrom. The fifth inner port 38e is suitably joined by a conduit 44f with the oil tank 18 for returning the scavenge oil thereto.

The detector circuit 62 includes a magnetic chip detector 64 which is removably joined to the module 36 by suitable bolts, for example, as illustrated in FIG. 2. The chip detector 64 is conventional in configuration for detecting the presence of any magnetic debris or chips in the scavenge oil. In the preferred embodiment illustrated in the figures, the chip detector 64 is electrically operated and includes a corresponding electrical lead 52d joined to a suitable monitor, with the lead being suitably removably joined to the detector 64 by a snap-together fitting. As shown in FIG. 3, the detector circuit 62 is also found in the same service module 36 as the other sensors, and is therefore in the same common location therewith for improving the access thereto for visual inspection, testing, and replacement if desired.

Figure 4:
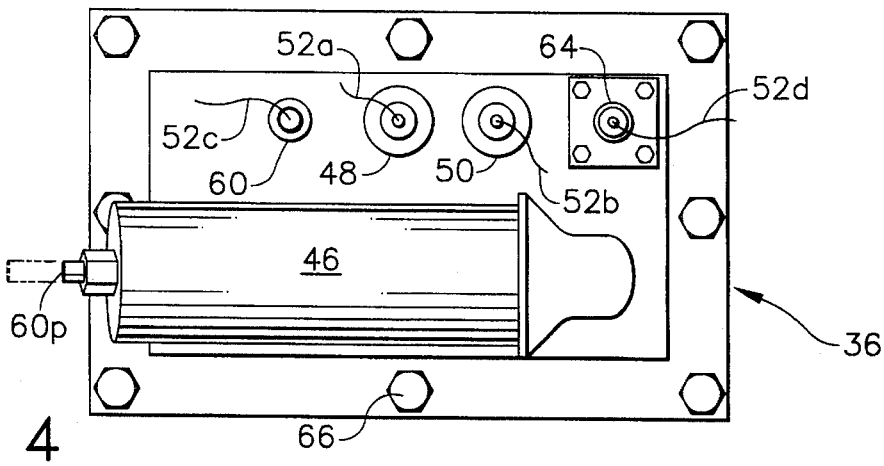
FIG. 4 is a bottom view of the service module illustrated in FIG. 2 and taken along line 4—4.

The common, one-piece service module 36 allows the various components to be conveniently located at one common site, with the entire module 36 being removably and sealingly joined to the mounting pad 34 for easy replacement thereof. The pad seat 34a and the module base 36a are preferably flat so that they abut each other upon assembly. The outer perimeter of the service module 36 preferably includes a plurality of apertures through which mounting bolts 66, as shown in FIGS. 2 and 4, may be inserted for fixedly and removably mounting the service module 36 to the mounting pad 34.

Since the adjoining inner and outer ports 38 and 40 may be disconnected from each other for removing the service module 36, suitable means are disposed between the pad seat 34a and the module base 36a for removably sealingly joining together respective ones of the inner and outer ports 38, 40. As shown in FIG. 6, the joining means may include any suitable gasket or seal arrangement including a plurality of inner O-rings 68 disposed at the juncture of respective ones of the inner and outer ports 38, 40. And an outer O-ring 70 preferably surrounds all of the inner and outer ports 38, 40 between the abutting seat 34a and base 36a.

In the exemplary embodiment illustrated in FIG. 2, a suitable cylindrical sleeve 72 extends outwardly from each of the outer ports 40 of the service module 36 and is disposed in alignment with a complementary one of the inner ports 38 which provide receptacles therefor. The individual O-rings 68 may be each assembled around each of the sleeves 72 for providing a fluid tight seal upon mating of the service module 36 and the mounting pad 34. The larger outer O-rings 70 may be mounted in a corresponding groove in the base 36a of the module 36 in a generally rectangular configuration around all of the outer ports 40 as illustrated in FIG. 6. The inner O-rings 68 provide primary sealing of the oil joints between the service module 36 and the mounting pad 34, with the outer O-rings 70 providing secondary sealing for minimizing the possibility of leaking and fire hazard therefrom.

The oil monitoring service module 36 disclosed above is an integrated component which allows service and maintenance work to be done at one, easily accessible location as desired. Oil pressure, temperature, and cleanliness may be readily observed using the sensors provided in the service module 36 itself. The individual sensors and valves as indicated above may be separately inspected, removed, and replaced as desired. Or, the entire service module 36 including the various components thereof may be replaced as a single unit. This improved approach to oil servicing, improves accessibility to oil monitoring sensors; centralizes service checkpoints; allows for simultaneous evaluation of all monitoring devices; improves personnel safety by reducing efforts to access difficult to reach components; and reduces packaging space.

The modular oil monitor 20 including the adjoining service module 36 and mounting pad 34 may be integrated into existing designs with corresponding modifications. It may be mounted wherever convenient to optimize maintenance or service access. It is adaptable to conventional Caravelle tail mounted engines which are normally best suited for vertical maintenance access, as well as to wing mounted engines which may have either vertical or horizontal maintenance access.

Since typical oil system malfunctions are commonly caused by the individual sensors or valves themselves, the modularity of the present invention separates the engine's continued operation from investigation of the oil system malfunction. This reduces actual service work on the engine itself, with more work being conducted at the service bench in examining and testing the removed components or entire service module 36. This also provides the additional benefit of improved technician safety and efficiency.

Although the invention has been described as joined to the bottom of the oil tank 18 in the exemplary embodiment, it may be located wherever convenient in the engine 10. For example, it may also be integrated with the oil cooler 28, or the main lube pump 26 if desired. Furthermore, additional components of the lubricating system may also be added into the service module 36 with suitable fluid connections through the mounting pad 34.

For example, the oil tank 18 includes a conventional pressure relief valve and an expansion space therein. These may instead be moved into the service module 36 itself. The oil tank pressure relief valve may be incorporated into the service module 36, with corresponding conduits provided through the mounting pad 34 to the oil tank 18. The expansion space required for proper operation of the oil tank 18 may be provided as a separate reservoir within or attached to the service module 36 and joined in flow communication through the mounting pad 34 to the oil tank 18. The oil tank 18 also includes a conventional oil level sensor having a mechanical float, and an electrical sensor, with the electrical sensor also being movable to the service module 36 for allowing its ready inspection and replacement if desired.

While there have been described herein what are considered to be preferred and exemplary embodiments of the present invention, other modifications of the invention shall be apparent to those skilled in the art from the teachings herein, and it is, therefore, desired to be secured in the appended claims all such modifications as fall within the true spirit and scope of the invention.

Accordingly, what is desired to be secured by Letters Patent of the United States is the invention as defined and differentiated in the following claims:

I claim:

1. A modular oil monitor for a gas turbine engine having a bearing supplied with oil from an oil tank and which discharges said supply oil into an oil sump as scavenge oil, comprising:

a mounting pad having a flat seat with a plurality of laterally spaced apart oil inner ports disposed therein and joined in flow communication with said tank and sump;

a service module having a flat base removably fixedly joined to said mounting seat, with said base having a plurality of laterally spaced apart oil outer ports disposed therein and joined in flow communication with respective ones of said inner ports; and wherein said module further includes a filter circuit disposed in flow communication between first and second ones of said outer ports, said filter circuit including an oil filter removably joined to said module for filtering said supply oil channeled therethrough, and a first sensor removably joined to said module for measuring oil temperature or pressure.

2. A monitor according to claim 1 wherein said module further comprises a relief circuit disposed in flow communication between said filter circuit and a third one of said outer ports, with a relief valve disposed therein for diverting a portion of said filtered oil from discharge through said second outer port to said third outer port.

3. A monitor according to claim 2 wherein said filter circuit further comprises a second sensor removably joined to said module, with said first and second sensors being effective for measuring oil temperature and pressure, respectively.

4. A monitor according to claim 3 wherein said module further comprises a detector circuit disposed in flow communication between fourth and fifth ones of said outer ports, and includes a magnetic chip detector removably joined to said module for detecting presence of magnetic chips in said scavenge oil.

5. A monitor according to claim 3 wherein said module further comprises a first bypass circuit disposed in flow communication with said filter circuit around said filter, and a bypass valve for bypassing said scavenge oil around said filter upon exceeding a preselected pressure resistance through said filter.

6. A monitor according to claim 5 wherein said module further comprises a second bypass circuit disposed in flow communication with said filter circuit around said filter, and a bypass sensor for sensing impending bypass of oil through said first bypass circuit.

7. A monitor according to claim 6 wherein said relief valve, bypass valve, and bypass sensor are removably joined to said module.

8. A monitor according to claim 3 further comprising means disposed between said pad seat and module base for removably sealingly joining together respective ones of said inner and outer ports.

9. A monitor according to claim 8 wherein said joining means include a plurality of inner O-rings disposed at the juncture of respective ones of said inner and outer ports, and an outer O-ring surrounding all said inner and outer ports.

10. A monitor according to claim 3 wherein said mounting pad is joined to said oil tank.

* * * * *